US011988353B2

(12) United States Patent
Almehio et al.

(10) Patent No.: US 11,988,353 B2
(45) Date of Patent: May 21, 2024

(54) METHOD FOR MANAGING IMAGE DATA AND AUTOMOTIVE LIGHTING DEVICE

(71) Applicant: VALEO VISION, Bobigny (FR)

(72) Inventors: Yasser Almehio, Bobigny (FR); Constantin Prat, Bobigny (FR)

(73) Assignee: VALEO VISION, Bobigny (FR)

(*) Notice: Subject to any disclaimer, the term of this patent is extended or adjusted under 35 U.S.C. 154(b) by 163 days.

(21) Appl. No.: 17/783,581

(22) PCT Filed: Dec. 8, 2020

(86) PCT No.: PCT/EP2020/085132
§ 371 (c)(1),
(2) Date: Jun. 8, 2022

(87) PCT Pub. No.: WO2021/116125
PCT Pub. Date: Jun. 17, 2021

(65) Prior Publication Data
US 2023/0003357 A1  Jan. 5, 2023

(30) Foreign Application Priority Data

Dec. 13, 2019 (FR) ...................... 19 14426

(51) Int. Cl.
*F21S 41/663* (2018.01)
*B60Q 1/14* (2006.01)
*H05B 45/10* (2020.01)

(52) U.S. Cl.
CPC .............. *F21S 41/663* (2018.01); *B60Q 1/14* (2013.01); *H05B 45/10* (2020.01)

(58) Field of Classification Search
CPC ........ F21S 41/153; F21S 41/663; F21S 41/60; B60Q 1/143; B60Q 1/1407; B60Q 1/122;
(Continued)

(56) References Cited

U.S. PATENT DOCUMENTS 6,061,475 A    5/2000  Blair
2018/0087732 A1*  3/2018  De Lamberterie ..... F21S 41/26
(Continued)

FOREIGN PATENT DOCUMENTS

DE   10 2008 062 639 A1   6/2010
DE   10 2015 012 808 A1   4/2017
JP      2019/522594 A     8/2019

OTHER PUBLICATIONS

International Search Report dated Mar. 19, 2021, in PCT/EP2020/085132 citing documents 1, 15, 16 and 24 therein, 5 pages.
(Continued)

*Primary Examiner* — Monica C King
(74) *Attorney, Agent, or Firm* — Oblon, McClelland, Maier & Neustadt, L.L.P.

(57) ABSTRACT

A method for managing image data in an automotive lighting device includes the steps of providing an image pattern, dividing the image pattern in rows or columns of pixels, and calculating a first gradient value related to the relation between the numeric value of a first pixel and the numeric value of an adjacent pixel. Also included is checking, for each pixel, if the difference between the corresponding gradient value and the first gradient fulfills one of a first or second condition, defining linear segments, compressing the data of the linear segments and sending the compressed data to the light module. The invention also provides an automotive lighting device for performing the steps of such a method.

20 Claims, 6 Drawing Sheets

(58) Field of Classification Search
CPC ..... B60Q 11/00; B60Q 11/002; B60Q 11/005; B60Q 1/14; B60Q 1/12; B60Q 2300/056; B60Q 2400/40; B60Q 1/085; B60Q 1/1415; B60Q 1/1423; B60Q 2300/146; B60Q 2400/20; B60Q 1/0023; B60Q 1/0088; B60Q 1/08; H05B 45/10; H05B 45/44; H05B 47/125; H05B 47/155; H05B 47/18; H05B 45/00; H05B 45/12; H05B 47/105; H05B 47/17; H05B 45/14; H05B 47/165; H04N 19/98; H04N 19/59; H04N 19/17; H04N 19/174; H04N 19/119; H04N 19/167; H04N 19/186; H04N 19/11; H04N 19/124; H04N 19/132; H04N 19/593; H04N 9/3138; H04N 9/3155; H04N 19/00; H04N 19/115; H04N 19/93; H04N 19/94; H04N 19/182; G06T 9/00; G06T 7/136; G06T 7/66; G06T 7/70; G06T 9/005
See application file for complete search history.

(56) References Cited

U.S. PATENT DOCUMENTS

2018/0187852 A1\* 7/2018 Albou .................. B60Q 1/1415
2019/0161001 A1\* 5/2019 Lahmer ................ B60Q 1/1415

OTHER PUBLICATIONS

Konstantinos Konstantinides et al: "An architecture for lossy compression of waveforms using piecewise-linear approximation", IEEE Transactions on Signal Processing, IEEE Service Center, New York, NY, US, vol. 42, No. 9, Sep. 1, 1994, pp. 2449-2454, XP000477181.
Japanese Office Action dated Jul. 14, 2023 in Japanese Patent Application No. 2022-535726 (with English Translation), citing reference 15 therein, 4 pages.

\* cited by examiner

[Fig. 1]
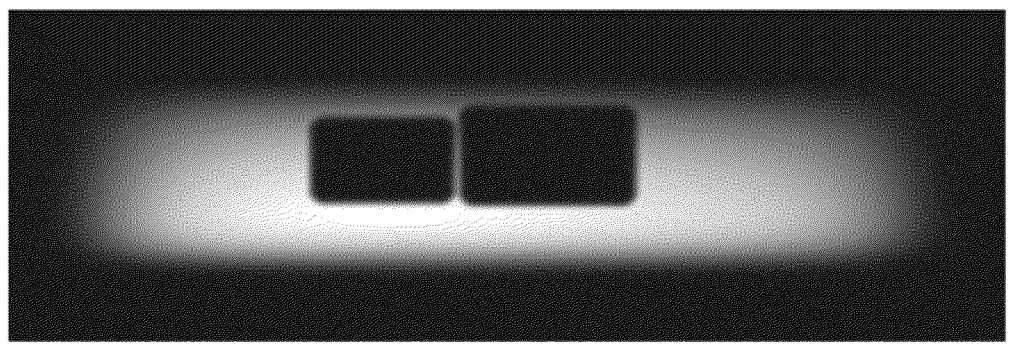

[Fig. 2]
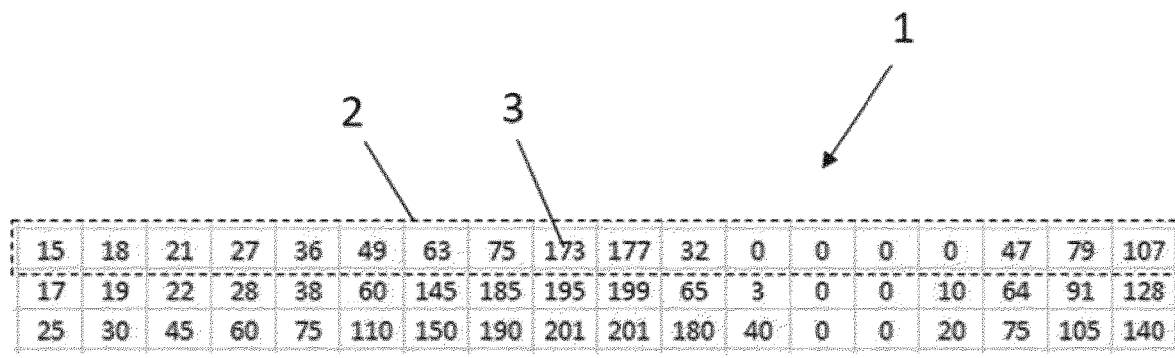

[Fig. 3]

| Pixel no | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Intensity | 15 | 18 | 21 | 27 | 36 | 49 | 63 | 75 | 173 | 177 | 32 | 0 | 0 | 0 | 0 | 47 | 79 | 107 |

[Fig. 4]

| Pixel no | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Gradient | 3 | 3 | 6 | 9 | 13 | 14 | 12 | 98 | 4 | -145 | -32 | 0 | 0 | 0 | 47 | 32 | 28 | -107 |

[Fig. 5]

| Pixel no | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Original | 15 | 18 | 21 | 27 | 36 | 49 | 63 | 75 | 173 | 177 | 32 | 0 | 0 | 0 | 0 | 47 | 79 | 107 |
| Linearized | 15 | 18 | 21 | 24 | 36 | 49 | 62 | 75 | 173 | 177 | 32 | 0 | 0 | 0 | 0 | 47 | 79 | 111 |

[Fig. 6]
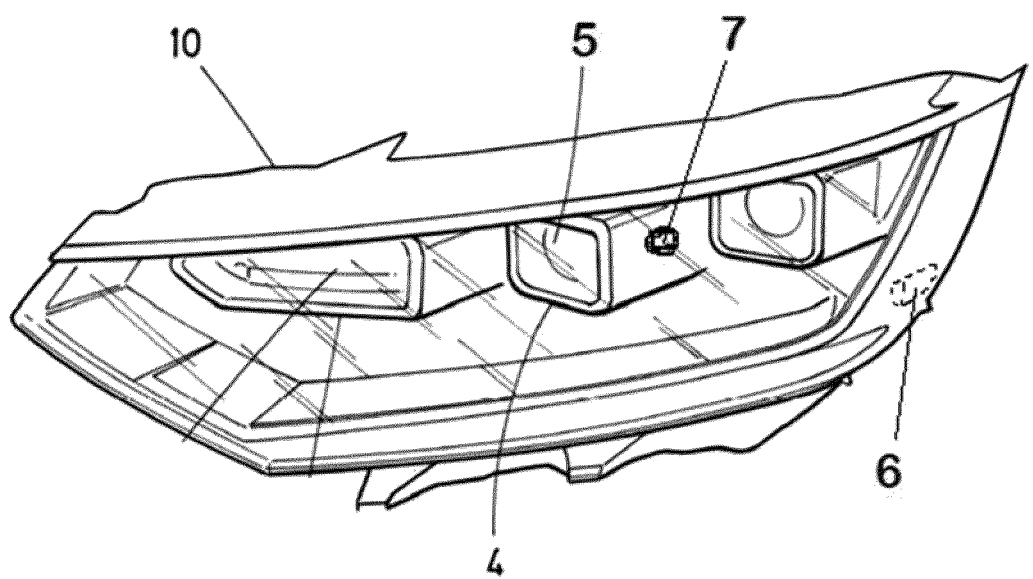

METHOD FOR MANAGING IMAGE DATA AND AUTOMOTIVE LIGHTING DEVICE

This invention is related to the field of automotive lighting devices, and more particularly, to the management of the electronic data derived from the control of the lighting sources.

Current lighting devices comprises an increasing number of light sources which has to be controlled, to provide adaptive lighting functionalities.

This number of light sources involves a big amount of data, which has to be managed by the control unit. The CAN protocol is often used, in some of their variants (CAN-FD is one of the most used ones) to transfer data between the PCM and the light module. However, some car manufacturers decide to limit the bandwidth of the CAN protocol, and this affects the management operations, which usually requires about 5 Mbps. The PCM is a Pixel Control Module, which is a control unit configured to manage the pixel pattern of each light module. Since each headlamp may comprises different light modules arranged to manage partially or totally at least one lighting function, it is important that they are controlled by a single control unit such as the PCM.

Current compression methods are not very efficient for high beam patterns, and this compromises the bandwidth reduction which is requested by car manufacturers.

This problem is even worse with the modern high resolution modules, where the information amount is much higher, while the limit in the bandwidth does not increase.

A solution for this problem is sought.

The invention provides a solution for these problems by means of a method for managing image data in an automotive lighting device, the method comprising the steps of
  providing an image pattern comprising a plurality of pixels, wherein each pixel is characterized by a numeric value related to the luminous intensity of the pixel;
  divide the image pattern in rows or columns of pixels, thus creating a plurality of row patterns;
  choose a first pixel of one of the row patterns and calculating a first gradient value related to the relation between the numeric value of the first pixel and the numeric value of an adjacent pixel;
  calculating, for each pixel, a corresponding gradient value;
  checking, for each pixel, if the difference between the corresponding gradient value and the first gradient fulfills one of a first or second condition;
  repeating the former step until finding an end pixel where the difference between the corresponding gradient and the first gradient does not fulfill the first condition;
  defining a linear segment between the first pixel and the end pixel;
  choosing a different first pixel and repeat the steps of calculating the first gradient value, calculating corresponding gradient values, checking the fulfillment of a first and second conditions, finding the end pixel and define a linear segment until defining segments for the whole row pattern;
  compressing the data of the linear segments; and
  sending the compressed data to a light module of the lighting device.

This method is aimed to manage the image data which is exchanged between a control unit and a light module. The control unit is in charge of calculating the image pattern and the compression data, and may be located in any position of the automotive vehicle, not necessarily physically inside the lighting device. The lighting module is aimed to provide a light pattern, either for lighting or signaling, and is located inside the lighting device.

The main advantage of this method is the increase in the compression rate, due to the optimization in the extension of the linear segments. The abovementioned method provides a fast and reliable way of extending the segment until the conditions are not met, thus providing a lower amount of data compared to the original pixels replaced thereby, especially when the image pattern is referred to a high beam pattern. The pseudo-Gaussian shape of the row patterns also contributes to the compression rate being increased, since there are some portions of the row pattern which can be replaced by a linear approximation without a significant loss in data.

In some particular embodiments, the light pixels of the image pattern are grey scale pixels, and more particularly, the luminous intensity of each pixel is according to a scale from 0 to 255.

Light modules usually define the light pattern on a grey scale, where the luminous intensity is graded from 0 to 255. This is a way of quantifying the light pattern so that it becomes able to be converted into light data, and then transmitted and managed by the control unit of the vehicle.

In some particular embodiments, the first condition comprises defining a first threshold value and checking if the absolute value of the difference between the corresponding gradient value and the first gradient is lower or equal than the first threshold value.

For each pixel, the first condition is checked. This first condition compares the corresponding gradient value calculated for each pixel with the first gradient value, which was calculated regarding the first pixel of the segment. When the corresponding gradient value deviates from the first gradient value in an amount which is higher than the first threshold value, the segment will finish in this end pixel.

In some particular embodiments, the second condition comprises defining a second threshold value and checking if the absolute value of the corresponding gradient value is lower or equal than the second threshold value.

For each pixel, the second condition is checked. This second condition just verifies that the absolute value of the corresponding gradient value calculated for each pixel is lower than a second threshold value. This is used to detect sudden high gradients.

In some particular embodiments, the method further comprises the step of decompressing the compressed data.

This step is convenient when the original image is to be projected by the light module.

In some particular embodiments, the compressed data is related only to a particular portion of the image pattern.

This cropping step is useful when a big portion of the image is completely dark, so that the compression stage is focused only on the portion which include representative values.

In a second inventive aspect, the invention provides a lighting device comprising
  a light module comprising a plurality of light sources; and
  a control unit to carry out the steps of a method according to the first inventive aspect.

This lighting device is able to operate with a lower bandwidth than the traditional ones.

In some particular embodiments, the light module further comprises a processor unit, the processor unit being configured to decompress the compressed data.

With a decompression stage in the proper light module, the bandwidth is narrowed until the module itself.

In some particular embodiments, the light sources are solid-state light sources, such as LEDs.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the life span of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

[FIG. 1] shows a first image of the photometry of a high beam module which is projected by an automotive lighting device according to the invention.

[FIG. 2] shows a portion of a pixel matrix representing an example of photometry.

[FIG. 3] shows a representation of a row pattern of a method according to the invention.

[FIG. 4] shows a representation of some of the steps of a method according to the invention.

[FIG. 5] shows the result of a linearization steps when a method according to the invention is used.

[FIG. 6] shows an automotive lighting device according to the invention.

In these figures, the following reference numbers have been used:

1 Image pattern
2 Row pattern
3 Pixel of the image pattern
4 Light module
5 LEDs
6 Control unit
7 Processor unit
10 Automotive lighting device
100 Automotive vehicle The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a first image of the photometry of a high beam module which is to be projected by an automotive lighting device according to the invention.

This first image may be divided into pixels and each pixel may be characterized by its luminous intensity, in a scale from 0, which would correspond to black, to 255, which would correspond to white.

FIG. 2 shows a portion of such a pixel matrix, called image pattern 1. Each pixel 3 of this image pattern 1 is characterized by a number according to the aforementioned scale. The compression of this image pattern 1 according to commercially available software products would offer a compression rate lower than 50%, which is unacceptable by some car manufacturers.

In this image, the pixels are divided into row patterns 2. Each pattern comprises a string of data, with numbers between 0 and 255, depending on the luminous intensity of the associated pixels. Obviously, the numeric values of these pixels are a simplified example, merely chosen for the sake of a better understanding of the invention, they do not correspond to the luminous intensity of the light pattern of FIG. 1.

FIG. 3 represents the first row of the previous Figure. There are 18 numerated pixels, each one with a numeric value representing the luminous intensity of each pixel.

A particular embodiment of the method of the invention would comprise the step of calculating a gradient for each pixel of this row pattern.

FIG. 4 represents such a gradient pattern. For each pixel, with respect to the previous Figure, the numeric value of the luminous intensity has been replaced by the corresponding gradient value.

The first pixel is taken as the starting point of the first linear segment. Then, for each pixel, two conditions are checked. If a pixel fulfills the two conditions, then this pixel belongs to the same linear segment. But if the pixel does not fulfill any of the two conditions, that pixel is set as the end pixel of the segment, and a different segment starts in the next one.

Following the example of FIG. 3, the first linear segment would start in the first pixel, which has a gradient value of 3. A first threshold value of 4 and a second threshold value of 50 are set.

Hence, for each pixel, the first condition would be that the difference between the corresponding gradient and the first gradient (which was 3) is lower or equal than 5.

In turn, the second condition would be that the gradient is lower than 50.

Provided these two conditions, the first segment would end in the fourth pixel, because the difference between its gradient and the first gradient value is higher than 5.

The second segment would therefore start in the fifth pixel. It would end in the eighth pixel, since this sixth pixel and seventh pixel fulfill both conditions, and the eighth pixel does not fulfill any of the first and second conditions.

The third segment would start in the ninth pixel and would end in the tenth pixel, since this pixel does not fulfill either the first or the second condition.

Following this method, the whole row will be converted into linear segments.

Each linear segment will have the gradient of the first pixel of each segment, to save data in the system. Hence, the luminous intensity values in the linearized version will be slightly different from the original ones.

FIG. 5 represent the linearized values of each pixel, representing each segment in a different colour.

For each pixel, the original luminous intensity value is represented by the row "Original" and the result of the linearized segments intensity value is shown by the row "Linearized". Each segment has a constant gradient, given by the gradient of the first pixel of each segment.

Obviously, in a row pattern with real data, the number of segments would be significantly lower than the number of pixels, this example only intended to address all the situations that may be faced by the method.

FIG. 6 shows an automotive lighting device according to the invention, this lighting device comprising:
- a light module 4 comprising a plurality of LEDs 5;
- a control unit 6 to carry out the compression steps described in the previous figures, generating the compressed data; and
- a processor unit 7, the processor unit 7 being configured to decompress the compressed data, this processor unit being located in the light module 4.

This light module would achieve a good quality projection with an improved transmission bandwidth.

The invention claimed is:

1. Method for managing image data in an automotive lighting device, the method comprising the steps of:
   providing an image pattern comprising a plurality of pixels, wherein each pixel is characterized by a numeric value related to the luminous intensity of the pixel;
   divide the image pattern in rows or columns of pixels, thus creating a plurality of row patterns;
   choose a first pixel of one of the row patterns and calculating a first gradient value related to the relation between the numeric value of the first pixel and the numeric value of an adjacent pixel;
   calculating, for each pixel, a corresponding gradient value; checking, for each pixel, if the difference between the corresponding gradient value and the first gradient fulfils one of a first or second condition;
   repeating the former step until finding an end pixel where the difference between the corresponding gradient and the first gradient does not fulfil the first condition;
   defining a linear segment between the first pixel and the end pixel; choosing a different first pixel and repeat the steps of calculating the first gradient value, calculating corresponding gradient values, checking the fulfilment of a first and second conditions, finding the end pixel and define a linear segment until defining segments for the whole row pattern;
   compressing the data of the linear segments; and
   sending the compressed data to a light module of the lighting device.

2. Method according to claim 1, wherein the light pixels of the image pattern are greyscale pixels, and more particularly, the luminous intensity of each pixel is characterized by a number according to a scale from 0 to 255.

3. Method according to claim 2, wherein the first condition comprises defining a first threshold value and checking if the absolute value of the difference between the corresponding gradient value and the first gradient is lower or equal than the first threshold value.

4. Method according to claim 2, wherein the second condition comprises defining a second threshold value and checking if the absolute value of the corresponding gradient value is lower or equal than the second threshold value.

5. Method according to claim 2, wherein the compressed data is related only to a particular portion of the image pattern.

6. Method according to claim 2, further comprising the step of decompressing the compressed data.

7. Automotive lighting device comprising: a light module comprising a plurality of light sources; and—a control unit to carry out the steps of a method according to claim 1.

8. Automotive lighting device according to claim 7, wherein the light module further comprises a processor unit, the processor unit being configured to decompress the compressed data.

9. Automotive lighting device according to claim 7, wherein the light sources are solid-state light sources, such as LEDs.

10. Method according to claim 3, wherein the second condition comprises defining a second threshold value and checking if the absolute value of the corresponding gradient value is lower or equal than the second threshold value.

11. Method according to claim 3, wherein the compressed data is related only to a particular portion of the image pattern.

12. Method according to claim 3, further comprising the step of decompressing the compressed data.

13. Automotive lighting device comprising: a light module comprising a plurality of light sources; and—a control unit to carry out the steps of a method according to claim 3.

14. Automotive lighting device according to claim 8, wherein the light sources are solid-state light sources, such as LEDs.

15. Method according to claim 4, wherein the compressed data is related only to a particular portion of the image pattern.

16. Method according to claim 4, further comprising the step of decompressing the compressed data.

17. Automotive lighting device comprising: a light module comprising a plurality of light sources; and—a control unit to carry out the steps of a method according to claim 4.

18. Method according to claim 5, further comprising the step of decompressing the compressed data.

19. Automotive lighting device comprising: a light module comprising a plurality of light sources; and—a control unit to carry out the steps of a method according to claim 5.

20. Automotive lighting device comprising: a light module comprising a plurality of light sources; and—a control unit to carry out the steps of a method according to claim 6.

* * * * *